United States Patent
Vangala et al.

(10) Patent No.: US 8,595,529 B2
(45) Date of Patent: Nov. 26, 2013

(54) EFFICIENT POWER MANAGEMENT AND OPTIMIZED EVENT NOTIFICATION IN MULTI-PROCESSOR COMPUTING DEVICES

(75) Inventors: Venkata Satish Kumar Vangala, San Diego, CA (US); Uppinder S. Babbar, San Diego, CA (US); Keyur C. Shah, Mumbai, IN (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 12/970,214

(22) Filed: Dec. 16, 2010

(65) Prior Publication Data

US 2012/0159218 A1 Jun. 21, 2012

(51) Int. Cl.
*G06F 1/00* (2006.01)
*G08C 17/00* (2006.01)

(52) U.S. Cl.
USPC .......................................... 713/323; 370/311

(58) Field of Classification Search
USPC .......................................... 713/323; 370/311
See application file for complete search history.

(56) References Cited

U.S. PATENT DOCUMENTS

| | | | | |
|---|---|---|---|---|
| 2007/0211725 A1* | 9/2007 | Kawata et al. | | 370/392 |
| 2008/0267214 A1* | 10/2008 | Jaakkola | | 370/468 |
| 2009/0119522 A1* | 5/2009 | Satoh | | 713/320 |
| 2009/0204829 A1 | 8/2009 | Fukuda | | |
| 2010/0023788 A1* | 1/2010 | Scott et al. | | 713/320 |
| 2010/0039971 A1* | 2/2010 | Lor et al. | | 370/311 |
| 2010/0165897 A1* | 7/2010 | Sood | | 370/311 |
| 2011/0019600 A1* | 1/2011 | Ping et al. | | 370/311 |

* cited by examiner

*Primary Examiner* — Kim Huynh
*Assistant Examiner* — Brandon Kinsey
(74) *Attorney, Agent, or Firm* — Nicholas A. Cole

(57) ABSTRACT

Methods and devices for reducing power consumption in a multi-processor computing device include filtering indications from the second processor intended for the first processor while the first processor is in a low power state, so that only selected, such as significant, indications are transmitted. The second processor may be informed when the first processor is in a low power state. Indications generated by the second processor may be compared to indication filtering criteria to determine whether each should be transmitted to the first processor. Those indications satisfying the indication filtering criteria may be sent to the first processor, causing it to return to a normal power state. In mobile computing device the first processor may be an applications processor and the second processor may be a modem. Filtering of indications may be accomplished in the second processor or in a power controller in some implementations.

80 Claims, 10 Drawing Sheets

EFFICIENT POWER MANAGEMENT AND OPTIMIZED EVENT NOTIFICATION IN MULTI-PROCESSOR COMPUTING DEVICES

FIELD

The present invention relates generally to multi-processor computing devices, and more particularly to methods for conserving power in multi-processor computing devices.

BACKGROUND

Historically wireless network communication devices (e.g., data cards, smart phones, dongles, etc.) have been built using a single processor which acts as a modem and also provides processing power for executing the user interface and applications. As wireless network communication speeds have increased and the portfolio of applications executing on wireless devices have expanded, such computing devices became in efficient. Most of the devices built today have a separate applications proc in order to handle increased central processor unit (CPU) requirements of advanced applications that are being developed to make use of new multimedia capabilities. Architectures including an applications processor and a modem processor are quite common for many wireless mobile devices (e.g., smart phones, PDAs, net books, etc.) these days. Along with increases in network speeds, applications processor speeds are increasing allowing many traditional PC applications to be supported on mobile devices. This is resulting in mobile device implementations that have significant power utilization and hence reduced battery life. To sustain the application and CPU requirements, it is critical to optimize power utilization on mobile devices.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
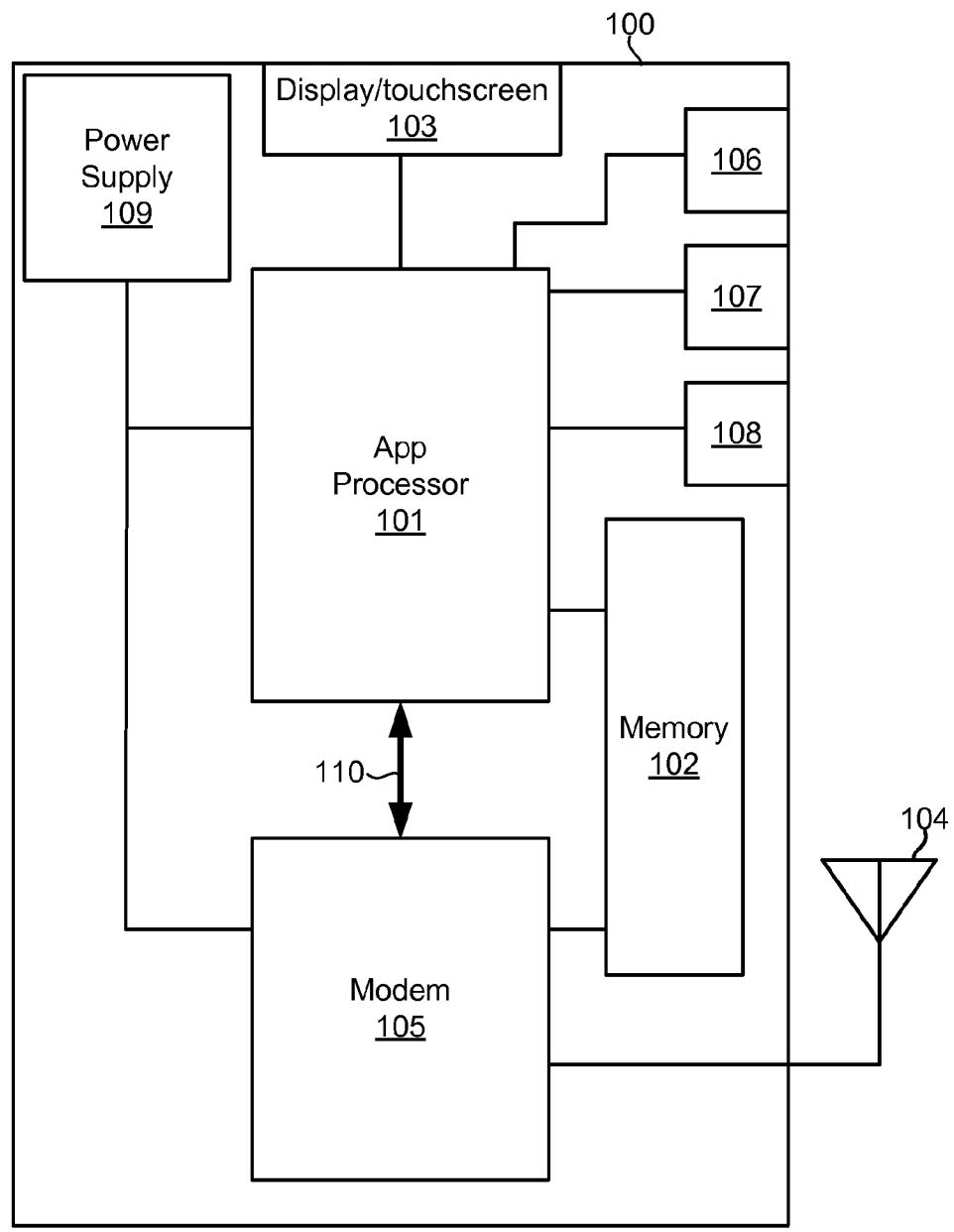
FIG. 1 is a component block diagram of a multi-processor computing device architecture suitable for use with various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "computing device" and "mobile computing device" refers to any form of multi-processor computer device, including but not limited to laptop and desktop computers, televisions, home appliances, cellular telephones, personal television devices, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, receivers within vehicles (e.g., automobiles), interactive game devices, notebooks, smartbooks, netbooks, mobile television devices, wireless modem dongles, computers (e.g., laptop computers) coupled to a wireless modem, dongle or other multi-processor programmable computing devices.

Mobile computing devices, such as smart phones, are in an idle state for a majority of the time during which they are just monitoring network events. A majority of the power consumption of multi-processor mobile devices is due to applications processor usage, and hence significant improvements in battery life of such devices can be achieved by efficiently suspending the applications processor usage during idle times and other intermediate states.

The various aspects provide methods and devices that enable an applications processor in a multi-processor computing device or computing device system to efficiently monitor event indications from a second processor, such as a wireless communication modem processor, in various states in order to reduce power consumption. The various aspects are generally applicable to any multi-processor computing architecture in which a first processor may enter a low power state and a second processor may signal events to the first processor. A wireless mobile computing devices (e.g., smart phones, wireless email devices, personal television receivers, etc.) may particularly benefit from the various aspects since they can provide significant battery life performance by reducing the power consumed by the device in normal operations.

In most wireless mobile computing devices the wireless receiver modem processor (referred to generally as "modem" herein) communicates frequently with the computing device's applications processor to provide low and high priority notifications. An example of low priority notifications include indications of the current received signal strength indication (RSSI) (which enables the applications processor to generate the signal strength "bars" image on the device display). An example of high priority notifications includes an event notification indicating an incoming telephone call or a received text message. Also, wireless mobile computing devices are typically battery powered and small in size, so conservation of battery power can yield significant improvements in the user experience.

Since wireless mobile computing devices provide a good example of the operation and benefits of the various aspects, the exemplary aspects illustrated in the figures and described below refer to computing devices having a first processor that is an applications processor and a second processor that is a wireless modem processor (referred to generally as a "modem" or "modem processor"). However, the use of such devices and processor references in the following descriptions of the aspects is for illustrative purposes only, and is not intended to limit the scope of the claims to the described implementation or architecture except as specifically recited in the claim language.

In typical wireless mobile computing devices the applications processor and modem processor may communicate with each other over a control channel. Such inter-processor signaling may be accomplished over any type interconnect, such as a serial bus, a parallel bus, a Universal Serial Bus (USB), etc. Typically, the applications processor issues control commands to the modem to control its operations, such as to originate a voice call, send a simple message service (SMS) message, or to control or initiate other modem operations. The modem typically generates asynchronous event signaling messages or "indications" that are passed over the interface to notify the applications processor of various network events. For example, the modem may generate events to notify the applications processor of changes in the RSSI value, change in serving system, change in data bearer, etc.

The various aspects enable an applications processor in a multiprocessor environments to prioritize event indications that may be received from a modem processor (or other second processor) based on its power management state. This enables an applications processor in a low power state to avoid having to receiver/process low priority notifications or event notifications that are irrelevant to the processor's current power state. This capability enables the applications processor to remain in a low power state to conserve power resources, while receiving and processing any high priority event notifications. For example, when the applications processor is in a low power state, an indication of a change in the modem's RSSI may not be passed to the applications processor, while an incoming call event indication will be passed so that the applications processor can "wakeup" to process the indication as normal (e.g., to activate the appropriate call ring tone, etc.) and respond to the high priority event.

The control channel through which the inter-processor communications pass may implement a variety of communication protocols. For example, messaging between the two processors may be based on standard AT commands or a proprietary modem defined signaling protocol. The various aspects are described herein using the Qualcomm Modem Interface (QMI) protocol as an example of a control signaling protocol. However, the aspects are independent of the control protocol used between the modem and applications processor. In the QMI protocol, QMI services are provided which control software modules or entities that control a communication port associated with the module or entity. In the QMI architecture, various QMI services may be provided, such as a data service which could support data communications and related messages, a voice call service (e.g., place a call, receive a call, obtain the caller ID, place a 3-way call, etc.). A general control entity, known as QCTRL, may control how many QMI services are supported, providing a host for such services, and providing a general administrative control for QMI services. More information regarding the QMI protocol is disclosed in U.S. patent application Ser. No. 11/499,238, entitled "Device Interface Architecture and Protocol," filed Aug. 3, 2006, which published as U.S. Patent Application Publication No. 2007/0124439, the entire contents of which are hereby incorporated by reference and included as an attachment hereto.

The QMI protocol provides for a QMI control service that permits control points to register for event notifications or indications based on modem processor events. In the QMI protocol events are posted to control points unconditionally following successful registration. Such a registration may occur at the time of power up, such as part of the power up operation sequences.

The proposed solution will permit the QMI control point to specify the desired modem event notifications to be received in various applications processor power management states. Once a low power state is enabled on the applications processor, the modem may block future modem event indications that are not listed in the permitted indications set (i.e., the set of indications that should be sent to the applications processor in the low power state). The permitted indications set is also referred to herein as indication filtering criteria.

It should be noted that while the various aspects are described in terms of filtering and processes that depend on whether the applications processor is in a low power and normal/high power state, the aspects are equally applicable to devices having multiple power states or operating modes (e.g., high power, normal power, reduced power and low power modes). There may be multiple power management states, each with its own set of indications that should be passed to the applications processor. Power management states without a registered indication set may be assumed to have no filter (i.e., all indications should be transmitted) or a complete filter allowing no events to the applications processor.

The various aspects can accommodate different multi-processor architectures. A first aspect described herein may be implemented in applications that enable direct power state notification between the applications processor and the modem (or other) processor in which the applications processor control point explicitly sets the QMI filtering mode implemented by the modem processor. A second aspect described herein may be implemented in applications that enable indirect power state notification, in which the applications processor power management state is conveyed indirectly via a modem processor entity, which sets the appropriate QMI filtering mode. A third aspect described herein enables filtering of event notifications based on applications processor's power state in architectures including a separate power controller. However, the various aspects are not limited to these three described architectures.

An architecture for a multi-processor computing device 100 suitable for use with the various aspects is illustrated in FIG. 1. The multi-processor computing device 100 illustrated in FIG. 1 is a mobile computing device with wireless communications capability. In this architecture, the computing device 100 includes an applications processor 101 that is coupled to memory 102 and to a wireless modem 105 that is coupled to an antenna 104. The modem 105 includes a modem processor which communicates with the applications processor 101 via an interface 110. A power supply 109, such as a rechargeable battery managed by a power management circuits, is coupled to the applications processor 101 and modem 105, enabling the modem 105 to be powered independently. Other components and user interface devices may be coupled to the applications processor 101, such as a display or touchscreen display 103, user interface buttons 106, a speaker 107 and a microphone 108.

In such a dual-processor architecture, the applications processor 101 may manage the execution of a user interface, applications, and overall executive control of the computing device 100, while the modem processor 105 manages functionality associated with maintaining and using a wireless data link. In such computing devices, the modem 105 will send a variety of indication messages over the interface 110 to the applications processor 101, informing it of status conditions and events associated with the wireless communication link and operations of the modem 105. For example, the modem 105 may send RSSI indication messages to the applications processor 100 informing it of the quality of the communication link, which enables the applications processor 101 to generate the suitable "bars" indication on the user interface display. Also, the modem 105 may send event indication messages that require the attention of the applications processor, such as an incoming call notification, terminated call notification, incoming SMS/MMS message notification, SMS/MMS delivery message notifications, and roaming status indication, to name just a few. The applications processor 101 may send status and command messages to the modem 105 over the same or a different interface. For example, the applications processor 101 may send commands to the modem to initiate a call, answer a call, terminate a call, transmit a file as an SMS or MMS message, transfer the contents of a received SMS or MMS message, etc. The applications processor 101 may also send status indications reflecting an operating state of the computing device.

In the various aspects, the applications processor 101 may send power state indication messages to the modem 105 indicating a current power state of the applications processor 101. In some aspects, the applications processor 101 may also communicate indications filtering criteria to enable the modem 105 to determine the particular status and event indications that should be communicated to the applications processor 101 depending upon the current power state of the applications processor. This communication of the filtering criteria may be accomplished in a registration process, which may occur during the start up processes. In other aspects, the filtering criteria may be predefined, such as part of provisioning configuration tables implemented in the modem 105. The indications filtering criteria enabling the modem 105 to determine the particular status and event indications that should be communicated to the applications processor 101. Thus, in response to receiving or determining the power state of the applications processor, the modem 105 may activate or implement the appropriate indication filtering criteria. Then, before sending an indication message generated by the modem to the applications processor 101, the modem may compare the generated indication to the indication filtering criteria, transmit an indication if it satisfies a filtering criterion, and store or delete the indication if the filtering criteria specifies that the indication message should not be transmitted in the current power state.

The filtering criteria or filtering table may specify indications that are to be communicated for particular applications processor power states. A variety of different data structures may be used for the filtering criteria, one example of which is illustrated in the following table which shows a subset of indication messages that may be communicated by a modem 105 to the applications processor.

TABLE 1

| Indication | Transmit on |
| --- | --- |
| RSSI | Normal state |
| Roaming | Normal state |
| Incoming call | All states |
| Incoming SMS message | Normal state |
| SMS message received | Normal power |

For example, a signal strength RSSI message may be irrelevant if the applications processor is in a low-power state in which the user interface display is deactivated. Therefore, the indication filtering criteria listed in Table 1 specifies that the RSSI should only be sent to the applications processor 101 when it is in a normal power state in which the applications processor is functioning to generate a display image. If the modem 105 generates an RSSI and determines that the applications processor 101 is currently in a low power state, the modem may delete the RSSI, or store it in a queue as discussed in more detail below. If the indication generated by the modem is an incoming call, Table 1 shows that the indication will be sent on to the applications processor 101 regardless of its current power state. If the applications processor is in a low power state, it may "wake up" in response to the indication so that it may process the incoming call, such as to sound the appropriate ring tone.

In computing devices in which application power is controlled by modules within each of the processors (as opposed to a separate power controller), the indication filter may be implemented in the second processor (e.g., the modem 105) as described below with reference to FIGS. 2-5. In this aspect, the filtered indications will not be sent by the modem, and only indications compatible with the current power state of the applications processor will be sent. In computing devices including a separate power controller, such as described below with reference to FIG. 6, such an indication filter may be implemented within the modem or within the power controller as described below with reference to FIGS. 6-8.

As described in more detail below, the applications processor 101 may be informed of indications that were not sent to it while it was in a low power state using one of at least three methods. These methods enable the applications processor 101 to re-synchronize with the modem 105 following a period in a low power state. In this manner, the duration that the applications processor 101 may remain in a low power state can be increased without causing problems with device operation or requiring lengthy re-initialization.

Direct Power State Notification Aspect

In a first aspect suitable for computing device architectures in which the applications processor 101 is configured to signal its power state to the modem 105, such a direct notification message can be used by the modem to set or implement the appropriate indication filtering criteria. In this direct state notification aspect, the applications processor control point explicitly informs the modem QMI of the applications processor power save state. In response to the power save state indication received from the applications processor, the modem may install the previously registered indication filter for all subsequent modem events until a new power save state indication is received. This aspect may apply to hardware configurations in which the applications processor state is decoupled from or otherwise unknown to the QMI on the modem processor. By registering for power state events at power-up of the modem the applications processor can move to various power states with low latency.

Figure 2:
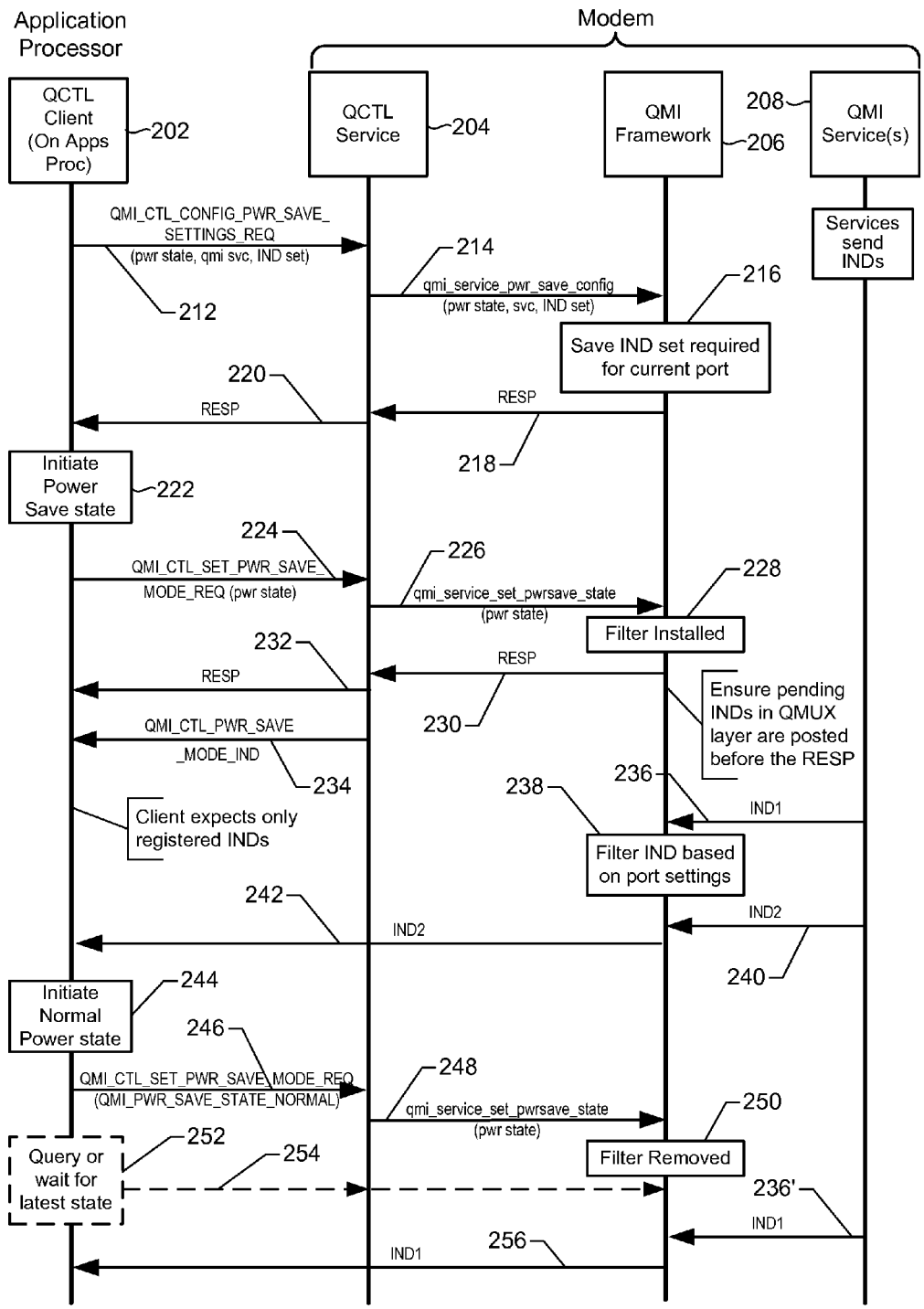
FIG. 2 is a message flow diagram of messages exchanged between a first and a second processor in a first aspect.

Example messages that may be exchanged between modules implemented in the applications and modem processors are illustrated in FIG. 2. As illustrated in FIG. 2, the method may be implemented among a QMI control service (QCTL) 202 operating on the applications processor and a QMI control service 204, QMI framework 206, and other QMI services 208 operating on the modem processor. An example method 300 for implementing power state-based filtering of inter-processor indications is illustrated in FIG. 3.

Figure 3:
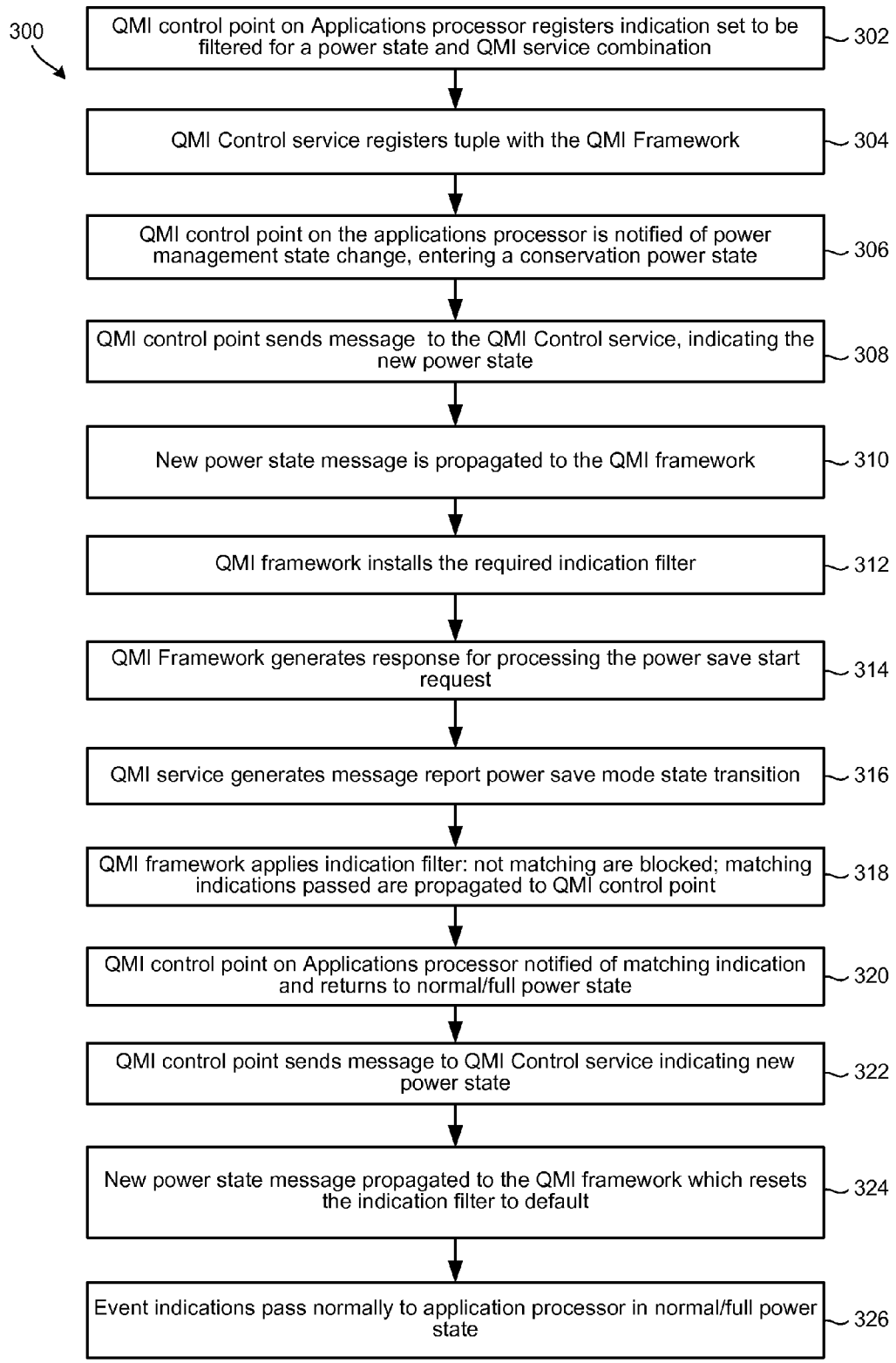
FIG. 3 is a process flow diagram of operations that may be performed in the first aspect method.

Referring to FIGS. 2 and 3 together, in method 300 in block 302 the QMI control point 202 on the applications processor registers with the modem an indication set to be filtered for a power state and QMI service combination. This may be accomplished by the QMI control point service 202 registering with the QMI Framework 206 a tuple of the applications processor's power state, the QMI service, and the set of the indications desired for the power state. This registration may be accomplished by sending message 212 to the QMI control service 204 on the modem. In block 304 and message 214, the modem QMI control service 204 may pass the tuple to the QMI framework 206. As part of block 304 and operation 216, the QMI framework 206 may store the tuple on a per-port basis such that indication filters are independently instantiated for each QMI control point. Also as part of operations in block 304, the QMI framework 206 may send a response message 218 to the QMI control point service 204, which may send a similar response message 220 to the applications processor QMI control point 202.

When the applications processor enters a lower power state, such as by initiating a power save state in operation 222, the QMI control point 202 on the applications processor is notified of the power management state change in block 306. Any known internal signaling protocol may be used to enable the applications processor to notify the QMI control point of such a power state change. In block 306 and message 224, the applications processor QMI control point sends a message to the QMI control service, indicating the new power state. As an example, this message 224 may be in the form of a QMI_CTL_SET_PWR_SAVE_MODE_REQ message. In block 308 and message 226, this power state message is propagated to the QMI framework 206, which installs, activates or implements the required indication filter in the modem in block 312 and operation 228. In block 306, the QMI framework generates a response message 230 indicating processing of the power save start request message. Prior to sending this response message 230 the QMI control point service may ensure that all pending indications in the modem QMI multiplexer layer are sent to the applications processor. Thus, the response message 230 may be generated only after ensuring there are no pending indications which might have otherwise been dropped due to the requested new power state filter. In message 232, the modem QMI control point service may forward the response message to the applications processor QMI control point 202. In block 316, the modem QMI service may generate and send a message 234 to the applications processor to report implementation of the power save mode state transition. For example, this message may be a QMI_CTL_POWER_SAVE_MODE_IND message. This event may be generated only if the QMI control point 202 previously registered for the power save mode. At this point the QMI control point service 202 expects to receive only registered indications, i.e., those indications in the set of indications identified in the registration.

In response to receiving a modem event indication (IND1) (messages 236, 240) generated by a modem QMI service 208, the modem QMI framework 206 applies the indication filter for the specific QMI service and port in block 318 and operation 238. As part of the operations in block 318, those received indications not matching the indications filter set identified by the applications processor (e.g., message 236) may be dropped or stored in a queue and not propagated to the applications processor QMI control point 202. In block 318, those indications matching the filter set (e.g., message 240) may be propagated to the applications processor QMI control point 202 in message 242. In block 320, in response to receiving a filtered indication message 242, the applications processor may initiate a transition to the normal power state in operation 244, and enter a normal/full power state. Also in block 320, the applications processor QMI control point 202 may be notified of the power management state change. In block 322, the applications process QMI control point 202 may send a QMI_CTL_SET_PWR_SAVE_MODE_REQ message 246 to the modem QMI control point service 204 indicating the new power state of the applications processor. This message may be propagated to the QMI framework 206 in block 324, which may reset the indication filter to default (e.g., no indication filtering). In block 326, a modem event indication generated by a modem QMI service 208 may be passed normally to the applications processor QMI control point 202 by the QMI framework 204, bypassing indication filtering.

In an optional aspect, after transitioning back to a normal power state, operation 244, the applications processor may send a query or wait for the latest state information from the modem in operation 252. This may involve sending an optional status update request message 254 to the modem requesting transmission of either queued indication messages (e.g., IND1 message 236), or resynchronization of all indication messages. In response to such inquiries, the modem (e.g., a modem QMI service 208 or the modem QMI framework 206) may send the queued indication message 236' which may be relayed to the applications processor QMI control service 202 in message 256. In this manner, the applications processor can become re-synchronized with the state of the modem by receiving any indication messages that were dropped or queued while the applications processor was in a low power state.

Indirect Power State Notification Aspect

In this aspect, the QMI driver 202 on the applications processor is not aware of the applications processor power state, requiring the QMI service on the modem to rely on some other modem entity to learn of the applications processor's power state. Using indirect notification (e.g., a hardware notification), the applications processor power state management is known by an entity on (i.e., software module operating on) the modem processor. This applications processor power state tracking module generates an indirect notification of the applications processor power management state. The applications processor power state tracking module within the modem then informs the modem QMI entities of the power save state, enabling the modem QMI framework to implement the appropriate previously registered indication filter for subsequent modem events. This aspect especially applies to hardware configurations in which the applications processor is tightly coupled to the modem processor.

Figure 4:
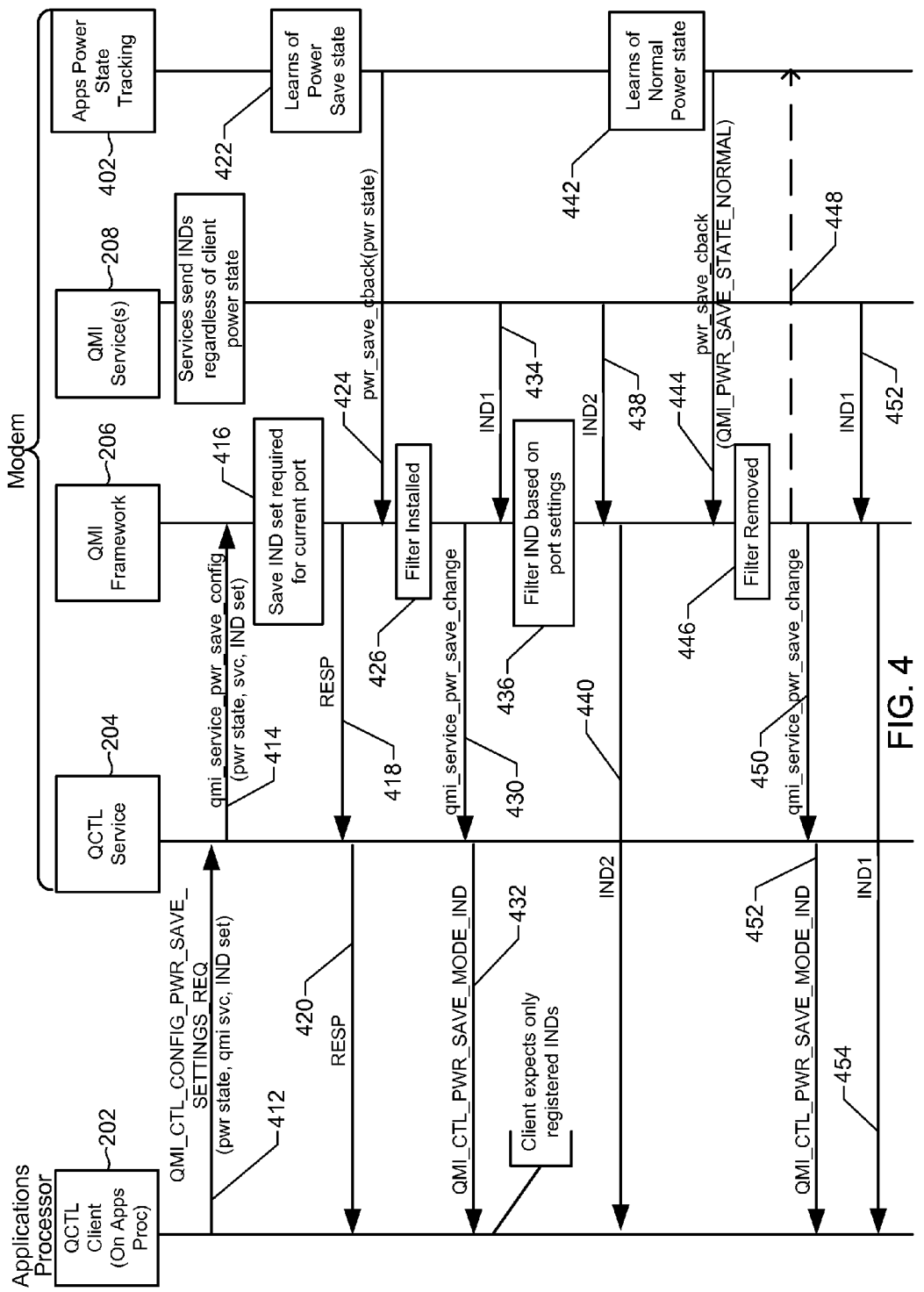
FIG. 4 is a message flow diagram of messages exchanged between a first and a second processor in a second aspect.

Example messages that may be exchanged between modules implemented in the applications and modem processors in this aspect are illustrated in FIG. 4. As illustrated in FIG. 4, the method may be implemented among a QMI control service (QCTL) 202 operating on the applications processor and a QMI control service 204, QMI framework 206, QMI services 208 and an applications processor power state tracking module 402 operating on the modem processor. An example method 500 for implementing power state based filtering of inter-processor indications is illustrated in FIG. 5.

Figure 5:
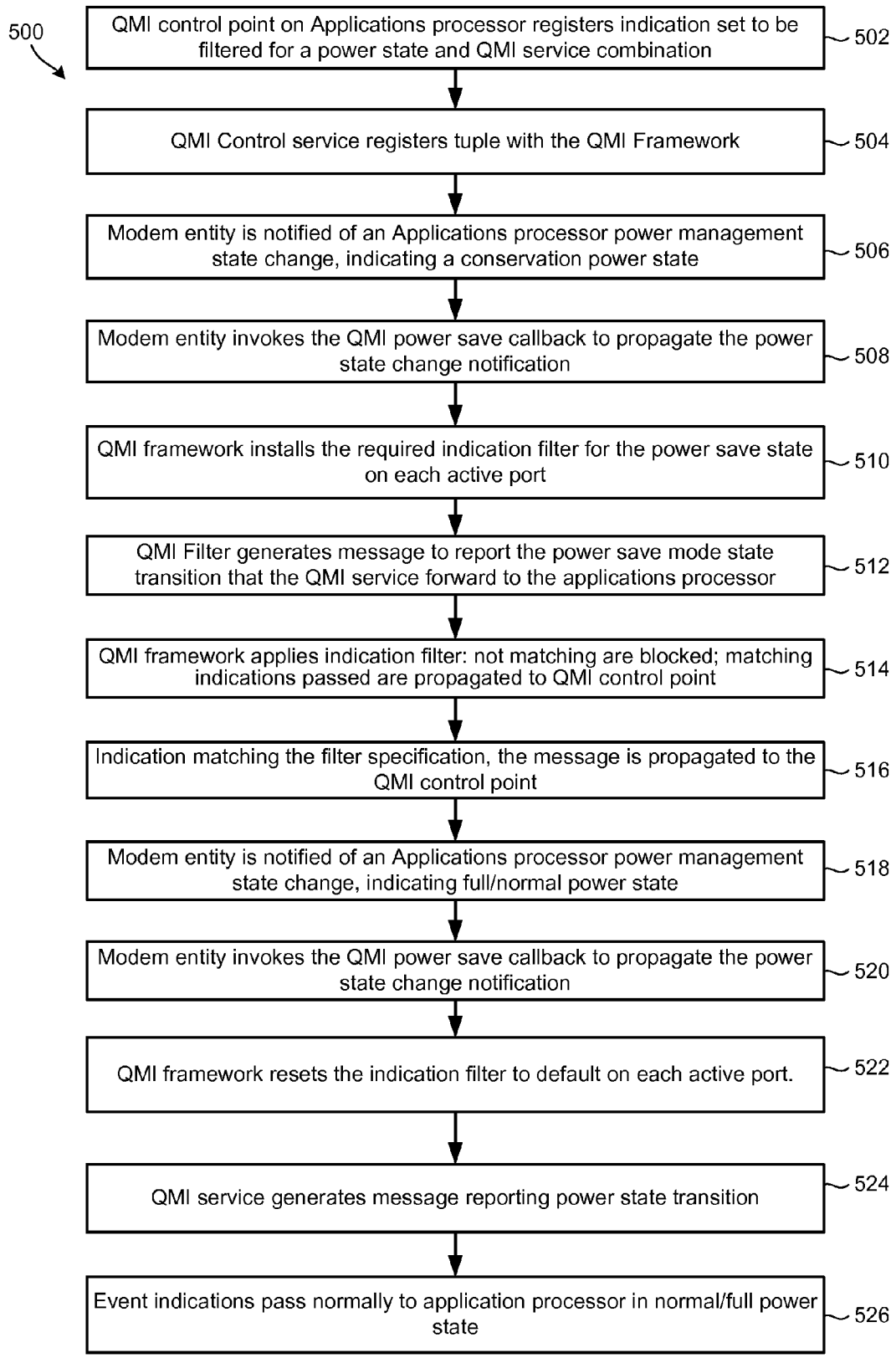
FIG. 5 is a process flow diagram of operations that may be performed in the second aspect method.

Referring to FIGS. 4 and 5 together, in method 500 in block 502, the QMI control point on the applications processor registers with the modem an indication set to be filtered for a power state and QMI service combination. As in the aspect method 300 described above with reference to FIGS. 2 and 3, this may be accomplished by the QMI control point service 202 registering a tuple of the applications processor's power state, QMI service, and indication set with the QMI Framework 206 by sending message 412 to the modem QMI control service 204. The modem QMI control service 204 may pass the tuple to the QMI framework 206 in message 414. As part of block 504 and operation 416, the QMI framework 206 may store the tuple on a per-port basis such that indication filters are independently instantiated for each QMI control point. Also as part of operations in block 504, the QMI framework 206 may send a response message 418 to the QMI control point service 204, which may send a similar response message 420 to the applications processor QMI control point 202.

When the applications processor enters a lower power state, such as by initiating a power save state, in block 506 and operation 422, the applications processor power state tracking module operating on the modem may detect the change in the applications processor power state, such as in the form of a GPIO signal, a flag or hardware signal. In block 508, the applications processor power state tracking module may invoke a QMI power save callback operation to propagate the power state change notification to other modules on the modem, including the QMI framework 206 in message 424. In block 510 and operation 426, the QMI framework 206 may install the required indication filter for the applications processor power save state on each active port. In block 512, the QMI framework 206 generates a power save change message 430 that is passed to the modem QMI service 204 which generates and sends a QMI_CTL_POWER_SAVE_MODE_IND message 432 to the applications processor QMI control point 202 reporting the power save mode state transition. This event may be generated only if the applications processor QMI control point 202 previously registered for it. Optionally, the QMI framework 206 may also send an acknowledgment message 428 to the applications processor power state tracking module 402.

In response to receiving a modem event indication (IND1) (messages 434, 438) generated by a modem QMI service 208, the modem QMI framework 206 applies the indication filter for the specific port in block 514 and operation 436. As part of the operations in block 514, those received indications not matching the filter set identified by the applications processor (e.g., message 434) may be dropped or stored in a queue and not propagated to the QMI control point 202. In block 516, those indications matching the filter set (e.g., message 438) may be propagated to the applications processor QMI control point 202 in message 440. In response to receiving a filtered indication message 440, the applications processor may initiate a transition to the normal/full power state. In block 518, the applications processor power state tracking module 402 may detect or be notified of the applications processor power management state change to full/normal power state. This notification may be accomplished in a manner similar to how the module is informed of the low power state. In block 518, the applications processor power state tracking module 402 may invoke the QMI power save callback to propagate the power state change notification other modules on the modem, including the QMI framework 206 in message 444. In block 522 and operation 446, the QMI framework 206 resets the indication filter to default on each active port. In block 524, the QMI framework 206 generates a power save change message 450 that is passed to the modem QMI service 204 which generates a message 452 to the applications processor QMI control point 202, such as a QMI_CTL_POWER_SAVE_MODE_IND message, reporting the power save mode state transition. This event may be generated only if the applications processor QMI control point 202 previously registered for it. Optionally, the QMI framework 206 may also send an acknowledgment message 448 to the applications processor power state tracking module 402. Thereafter, modem event indication (IND1) messages 452 generated by a QMI service 208 are passed to the applications processor QMI control point 202 in messages 454 as normal, without indication filtering by the QMI framework 206.

Hardware Based Wakeup Aspect

Some devices may have dedicated hardware for power management that controls signaling to the applications processor when it is a low power state. In such devices, busses and connections to the applications processor may be deactivated by the power controller. In such devices, signals to the applications processor to initiate wake up may go through the power controller which determines whether the indication satisfies indication filtering criteria justifying waking up the applications processor.

Figure 6:
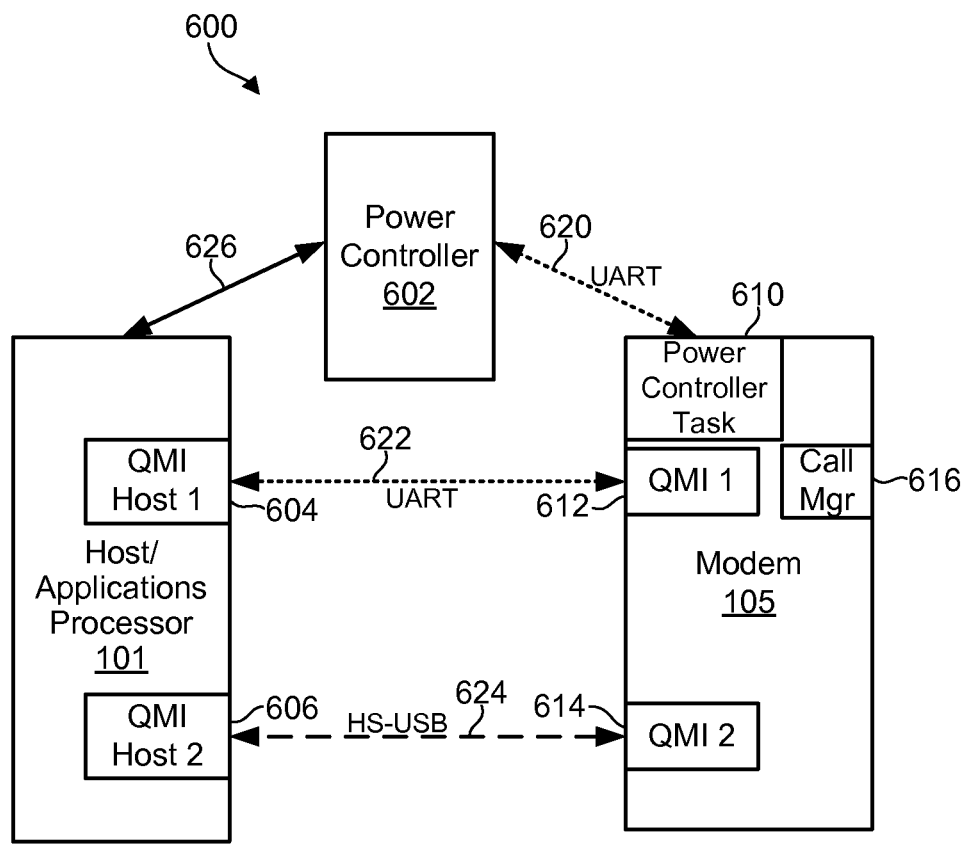
FIG. 6 is a component block diagram of a computing device architecture suitable for use with a third aspect.

An example of such a computing device architecture 600 is illustrated in FIG. 6. In this example architecture 600, the applications processor 101 and modem processor 105 may communicate by one or more communication interfaces, such as a universal asynchronous receiver/transmitter (UART) link 622 between a QMI host 1 operating in the applications processor 101 and a QMI service 1 operating in the modem 105. The example architecture illustrated in FIG. 6 also shows a second communication link between the two processors in the form of a high-speed universal serial bus (HS-USB) 624 connecting a second QMI host 2 operating in the applications processor 101 and a second QMI service 2 operating in the modem 105. In this architecture, the applications processor 101 may be coupled to a power controller 602 that performs functions associated with controlling power states the various components, including the applications processor, such as through a control command link 626. The modem 105 may also communicate with the power controller 602, such as through a UART communication link 620 that enables signaling between the power controller 602 and a power controller task module 610 within operating within the modem 105. Additionally, a call manager module 616 may be operating in the modem 105 for managing telephone and data calls via an external network.

In order to enable a computing device implementing such an architecture to achieve greater power conservation by shielding the applications processor 101 from lower priority indications while it is in a low power state, the modem 105 may be configured to disable all QMI notifications over the interconnect to the applications processor 101 in low-power states (i.e., applications processor power state other than the normal/high power state). Additionally, the modem 105 may be configured with software to implement an embedded modem to listen for network events. The embedded modem 105 may then use general purpose input/output (GPIO) signals to inform the power controller 602 of state change notifications, such as by signaling over a UART connection 620. Such notifications enable the power controller 602 to determine when to wake up the host/applications processor 101 and inform the host/applications processor 101 of the type of event, thereby enabling the host/applications processor 101 to synchronize faster with the modem 105.

Figure 7:
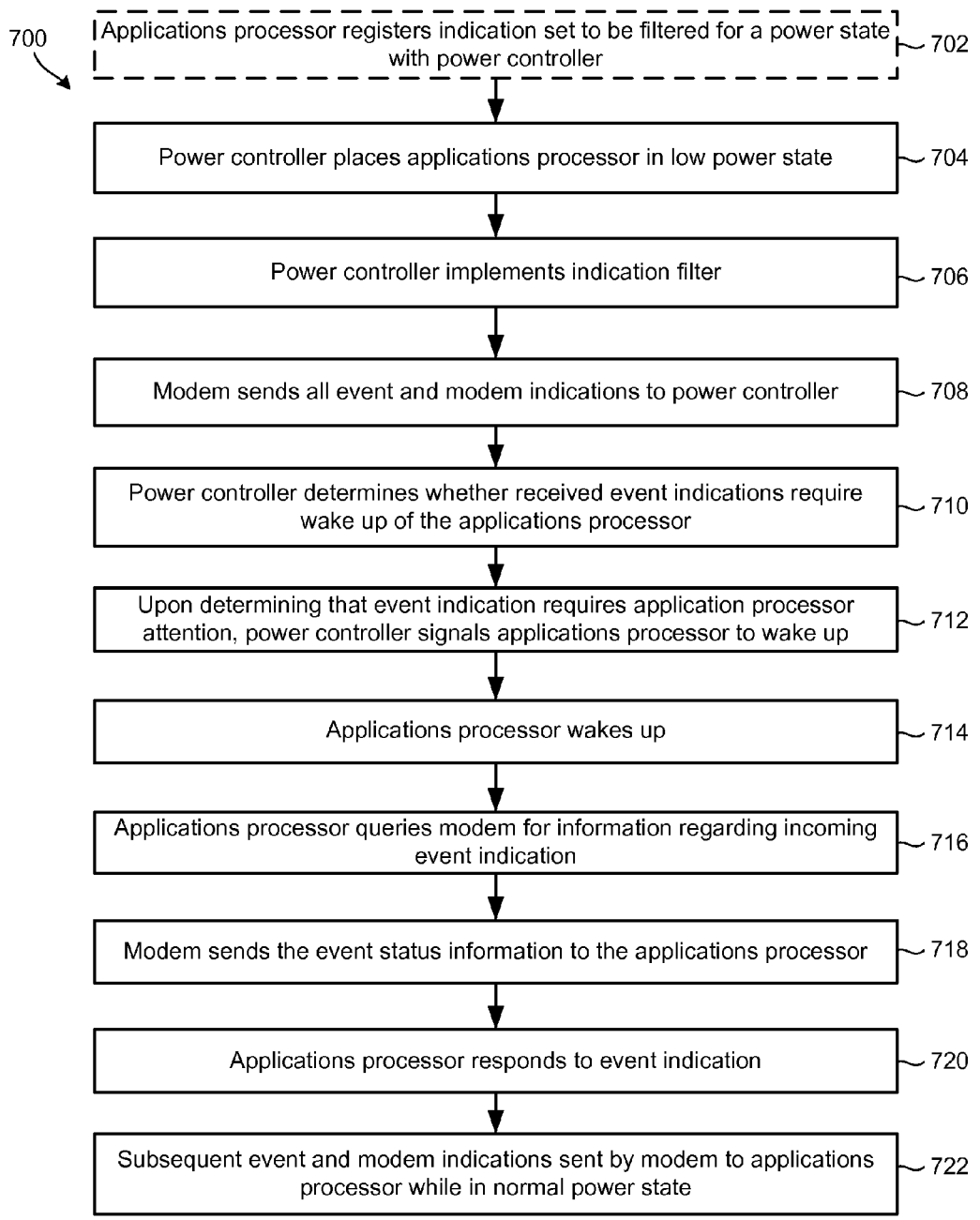
FIG. 7 is a process flow diagram of operations that may be performed in a third aspect method.
Figure 8:
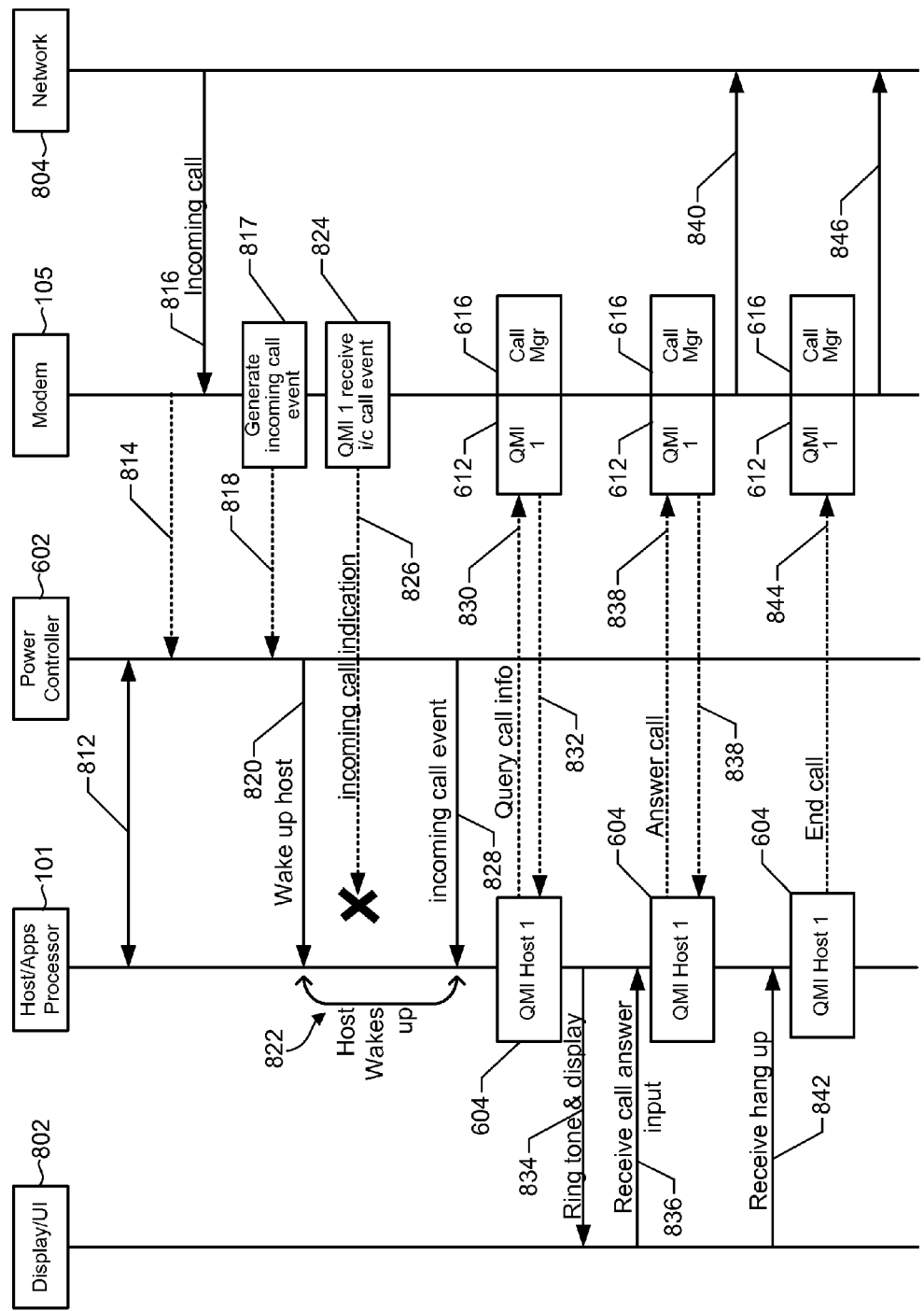
FIG. 8 is a message flow diagram of messages exchanged between a first processor, a second processor, and a power controller in the third aspect.

An example method 700 for implementing power state based filtering of inter-processor indications is illustrated in FIG. 7. FIG. 8 illustrates examples of messages that may be exchanged between modules implemented in the applications processor 101, modem 105, and power controller 602 in the computing device architecture illustrated in FIG. 6 in the event of an incoming telephone call.

Referring to FIG. 7, in method 700 in block 702, the host or applications processor 704 may register with the power controller 706 a set of indications to be passed to it in a low power state. This registration may be part of a power up sequence of operations. This block 702 is optional since the control processor 602 may be configured with an indication filtering set as part of the device manufacture, assembly or provisioning processes. In block 704, the power controller 706 may place the applications processor 101 in a low power state. Alternatively, in block 704, the power controller may receive an indication that the applications processor is in a low power state. As part of 704, the power controller may deactivate communication interfaces between the applications processor 101 and the modem 105. Also as part of block 704, the modem 105 may be informed of the power state of the applications processor by the power controller, or the modem 105 may discover the applications processor power state through a GPIO signal or based upon the availability of the inter-processor communication interfaces 622, 624. In block 706, the power controller 602 may implement the indications filter appropriate to the power state of the applications processor. In block 708, the modem 105 may send all event and modem indications to the power controller 602, such as via a UART link 620. In block 710, the power controller compares received modem indications to determine whether the received event invitations require the applications processor to be woken up. If the power controller determines that the received event indication matches an indication filter (i.e., the indication is one that should be passed to the applications processor when it is in a low power state) the power controller may signal the applications processor to wake up in block 712. In block 714, the applications processor completes the wake up process, and in block 716 send a query to the modem 105 requesting information regarding the incoming event indication. Since the applications processor was in a low power state prior to waking up, modem indications provided by the modem before then will have been lost. Therefore, the applications processor needs to request the information in order to process the incoming event indication. In block 718, the modem responds to the query by sending the event indications to the applications processor. In block 720, the applications processor processes the event information and provides an appropriate response to the event. In block 722, subsequent events and modem indications sent by the modem will be passed to the applications processor as long as it remains in a normal power state, with the inter-processor data communication interfaces energized.

An example of this aspect is illustrated in FIG. 8 which shows example messages that may be passed among components in the example of an incoming telephone call. As described above with reference to FIG. 7, the applications processor 101 and power controller 602 may signal each other regarding the applications processor entering a low power state in messages 812. While in a low power state, the modem 105 may send status indication messages 814 to the power controller 602. With the applications processor 101 in a low power state, such modem indications may not be received by the applications processor, since the communication links may be deenergized. Thus, indications that the power controller determines do not satisfy indication filtering criteria may be dropped. In the event of an incoming call 816 from a communication network 804, the modem 105 may generate an incoming call event indication in operation 817 that is sent to the power controller 602 in message 818. The power controller 602 may recognize that an incoming call event satisfies the indication filter criteria, and send a signal 820 to the applications processor 101. In response, the applications processor may begin the wake up process 822. Until the applications processor 101 has completed the wake up process, indications from the modem 105, such as a QMI incoming call indication 826 from the modem QMI 1 (block 612 in FIG. 6), may not be received, and thus may be dropped.

When the applications processor has completed the wake up process, the power controller 602 may inform it of the indication that prompted the wake up event, such as by transmitting an incoming call event message 828. Such an incoming event message may be processed by the QMI host 1 (block 604 in FIG. 6), which may then issue a query message 830 to the modem QMI 1 612 requesting information related to the call event. The modem QMI 1 612 may obtain the requested call information from the call manager 616 and reply with the requested call information in message 832. The applications processor 101 may then process the call event, such as by sending the appropriate ring tone and display commands 834 to the device display and user interface 802. User inputs provided to the user interface 802 may be passed to the applications processor in signals 836. The user input to answer the call may be processed by the applications processor QMI 604 which sends a call answer command 838 to the modem QMI 1 612. Such a command may be answered in a reply message 838 so that the applications processor can generate the appropriate display. At the same time, the call manager 616 may communicate with the network 804 via messages 840 in order to accept the call and establish a telephone call data link. At the conclusion of the telephone call a button press by the user to hang up may be sent as a button signal 842 to the applications processor 101. A command to terminate the call 844 may be sent by the applications processor QMI host 604 to the modem QMI 1 612. The QMI 612 may pass the call termination command to the call manager 616 which sends a call termination message 846 to the network 840.

Allowing the applications processor to selectively drop or not receive modem indications and notifications may require the applications processor to resynchronize its state with the modem processor whenever there is a power state change. This can be accomplished by a variety of methods, three examples of which include the following. In a first method, the modem may generate an indication to inform the applications processor of a list of dropped events, enabling the applications processor to query the modem for missed indications to enable it to resynchronize. In a second method, the modem may queue the events indications instead of dropping them. Then when the applications processor returns to a power state suitable for receiving the indications, the modem may send the event indications stored in the queue to the applications processor. In a third method, the applications processor may always initiate re-synchronization with the modem after every power state change to obtain its complete state.

Plurality of Power States Aspect

Figure 9:
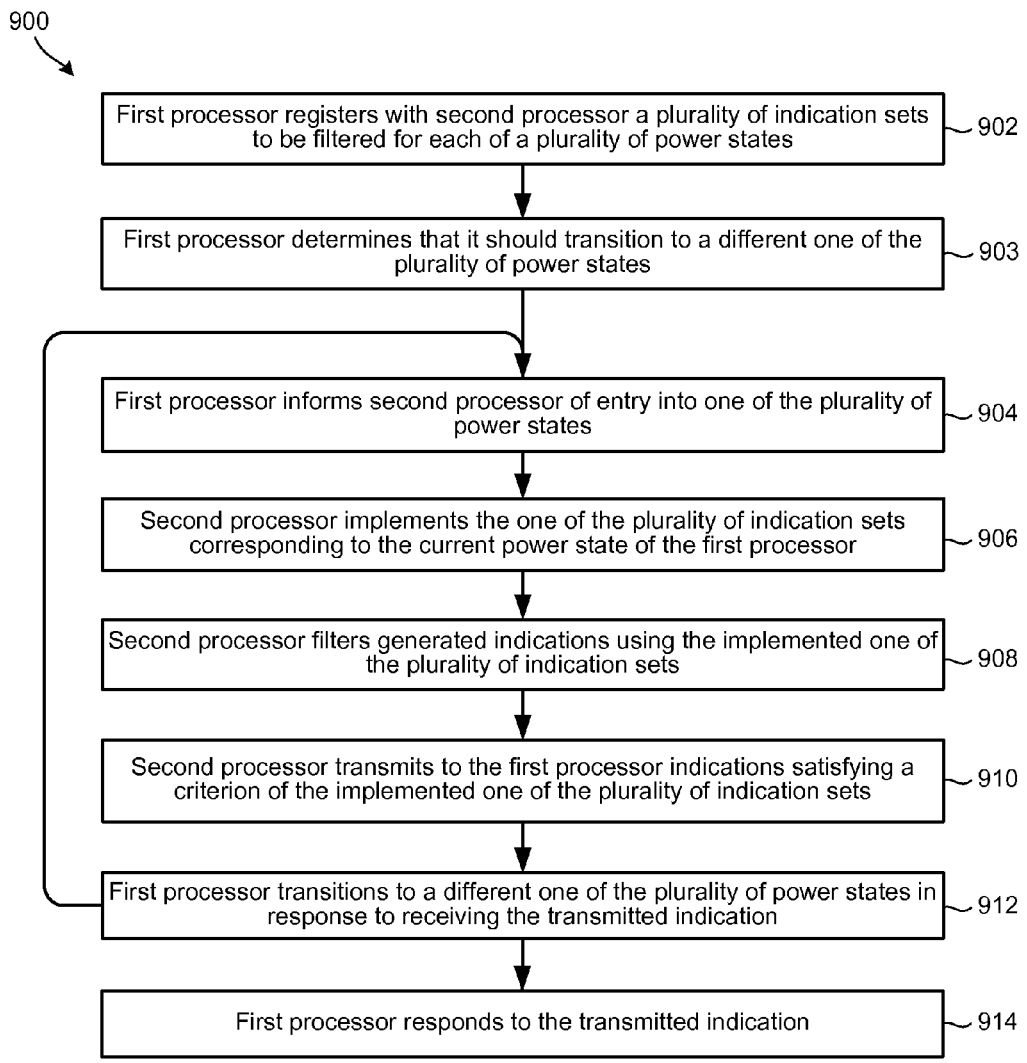
FIG. 9 is a process flow diagram of operations that may be performed in a fourth aspect method.

As discussed above, the various aspects may be implemented in a multi-processor computing device in which the first processor is configured to enter more than two power states (i.e., a plurality of power states number more than two), such as power saving power states of varying power saving characteristics for which different indication filtering criteria are appropriate. An example of a method 900 that may be implemented in such an aspect is illustrated in FIG. 9. Method 900 may be implemented with any of the computing device architectures and message flow organizations described above with reference to FIGS. 1-8. Method 900 may be implemented in a computing device in which the first processor is an applications processor and the second processor is a modem, but it also may be implemented in other device architectures.

In method 900 in block 902, the first processor may register with the second processor a plurality of indication filtering criteria sets (e.g., a plurality of indication sets to be blocked or transmitted), with each of the plurality of indication filtering criteria sets configured for or associated with a different one of the plurality of power states of the first processor. During operation, the first processor may determine that it should transition to a different one of the plurality of power states in block 903. This determination may be based upon a current operating state or operation, such as an operating state in which the processor is idle and may remain in an idle state long enough to save battery power by transitioning to a lower power state. In block 904, the first processor may inform the second processor that it has entered one of the plurality of power states. As with the previously described aspects, this information may be communicated by sending a power state message from the first processor to the second processor, or by setting an operating state that a power state monitoring module operating in the second processor may use to infer the power state of the first processor. Also, the second processor may be a power controller coupled to the first processor that is informed of the power state through its interactions with the first processor.

In block 906, the second processor may implement the one of the plurality of indication filtering sets corresponding to the current power state of the first processor. Thereafter, in block 908 the second processor filters indications generated by the second processor using the implemented filtering criteria, i.e., the filtering criteria specified for the one of a plurality of power states that the first processor is in. Generated indications that do not satisfy a criterion of the implemented indication filtering criteria set may be dropped or stored in a queue as described above. In block 910, those generated indications satisfying specified for the power state of the first processor may be sent by the second processor to the first processor. In block 912, the first processor may received the transmitted filtered indication, and in response, transition to a different one of the plurality of power states. For example, the first processor may transition to full power state or an intermediate power state that is capable of using or reacting to the filtered indication. Also, as described above with reference to FIG. 7, a power controller may accomplish the filtering and may inform the first processor that it should transition to a second power state, and the filtered indication may be transmitted to the first processor when the first processor has completed the transition to the different power state. In block 914, the first processor may respond to the transmitted indication. As described above, this block may involve requesting or waiting for the second processor to send information regarding the indication as well as indications that were previously dropped or stored in a queue.

As part of the operations in block 912, the first processor may inform the second processor that it has entered the different one of the plurality of power states by returning to block 904. Method 900 may continue to be implemented in this manner with the second processor implementing one of the plurality of indication filtering sets that is appropriate for the current power state of the first processor. It should be appreciated that in such an aspect, one of the plurality of indication filtering sets may specify that all indications should be transmitted, such as may be appropriate for a full-power power state.

Figure 10:
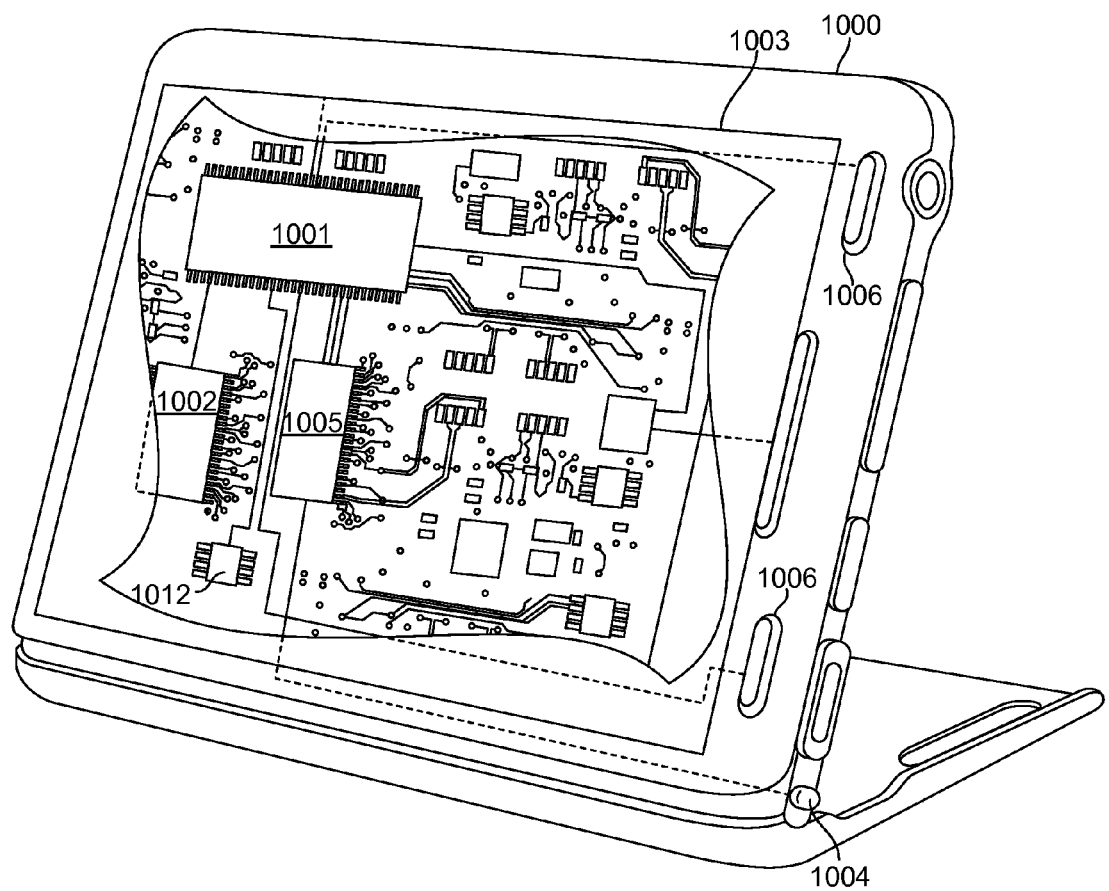
FIG. 10 is a perspective view of a mobile multi-processor computing device suitable for use with the various aspects.

The aspects may be implemented in a variety of computing devices, particularly mobile computing devices which can benefit from improvements in power savings. An example of a mobile computing device that may implement the various aspects is a smart phone 1000 illustrated in FIG. 10. As discussed above with reference to FIG. 1, a multi-processor computing device, such as a smart phone 1000, may include an applications processor 1001 coupled to memory 1002 and to a radio frequency data modem 1005. The modem 1005 may be coupled to an antenna 1004 for receiving and transmitting radio frequency signals. The smart phone 1000 may also include a display 1003, such as a touchscreen display. The mobile device may also include user input devices, such as buttons 1006, to receive user inputs. In some implementations the smart phone 1000 may also include a power controller 1012 that is coupled to the applications processor 1001.

As explained above, the references in the foregoing aspect descriptions to a modem is for example purposes only. Such a modem may include a general or special purpose processor configurable with processor-executable instruction. Also, instead of being a modem, the second processor may be a general purpose processor. The first and second processors 1001, 1005 may be any programmable microprocessor, microcomputer or multiple processor chip or chips that can be configured by software instructions (applications) to perform a variety of functions, including the functions of the various aspects described herein.

Typically, software applications may be stored in the internal memory 1002 before they are accessed and loaded into the processor 1001, 1005. In some mobile computing devices, additional memory chips (e.g., a Secure Data (SD) card) may be plugged into the device and coupled to the processors 1001, 1005. The internal memory 1002 may be a volatile or nonvolatile memory, such as flash memory, or a mixture of both. For the purposes of this description, a general reference to memory refers to all memory accessible by the processors 1001, 1005, including internal memory 1002, removable memory plugged into the computing device, and memory within the processors 1001, 1002 themselves.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for implementing a low power state in a first processor of a multi-processor computing device, comprising:
    registering a set of indication filtering criteria on a second processor of the multi-processor computing device, wherein the set of indication filtering criteria identifies a communications control service on the second processor, and wherein the indication filtering criteria comprise indications that should be sent to the first processor when the first processor is in the low power state;
    informing the second processor that the first processor is in the low power state;
    establishing an event indication generated by the communications control service on the second processor;
    determining whether the event indication matches an indication in the registered set of indication filtering criteria; and
    sending the event indication from the second processor to the first processor in response to determining that the event indication matches an indication in the registered set of indication filtering criteria.

2. The method of claim 1, wherein informing the second processor that the first processor is in the low power state comprises sending a power state message from the first processor to the second processor.

3. The method of claim 1, wherein informing the second processor that the first processor is in the low power state comprises monitoring the first processor's power state with a power state monitoring module operating in the second processor.

4. The method of claim 1, wherein determining whether the event indication matches an indication in the registered set of indication filtering criteria is performed within the second processor.

5. The method of claim 1, further comprising returning the first processor to a normal power state in response to determining that the event indication matches an indication in the registered set of indication filtering criteria.

6. The method of claim 1, wherein determining whether the event indication matches an indication in the registered set of indication filtering criteria is performed within a power controller coupled to the first processor.

7. The method of claim 6, wherein sending the event indication from the second processor to the first processor in response to determining that the event indication matches an indication in the registered set of indication filtering criteria comprises:
    receiving, in the power controller, the event indication generated by the communications control service on the second processor;
    signaling from the power controller to the first processor a message to wake up the first processor; and
    sending the event indication to the first processor from the power controller when the first processor has woken up and returned to normal power.

8. The method of claim 7, further comprising:
    sending a query to the second processor from the first processor after the first processor has returned to normal power, wherein the query requests information regarding the event indication; and
    sending information regarding the event indication from the second processor to the first processor in response to the query.

9. The method of claim 1, further comprising:
    in response to determining that the event indication does not match an indication in the registered set of indication filtering criteria:
        storing the event indication; and
        sending the stored event indication from the second processor to the first processor when the first processor exits the low power state.

10. The method of claim 1, wherein the first processor is an applications processor, and the second processor is a modem.

11. A method for implementing one of a plurality of power states in a first processor of a multi-processor computing device, comprising:
    registering, on a second processor of the multi-processor computing device, a set of indication filtering criteria specified for the one of the plurality of power states, wherein:
        the set of indication filtering criteria identifies a communications control service on the second processor; and
        the indication filtering criteria comprise indications that should be sent to the first processor when the first processor is in the one of the plurality of power states;
    informing the second processor that the first processor is in the one of the plurality of power states;
    establishing an event indication generated by the communications control service on the second processor;
    determining whether the event indication matches an indication in the registered set of indication filtering criteria; and sending the event indication from the second processor to the first processor in response to determining that the event indication matches an indication in the registered set of indication filtering criteria specified for the one of the plurality of power states.

12. The method of claim 11, wherein informing the second processor that the first processor is in the one of the plurality of power states comprises sending a power state message from the first processor to the second processor.

13. The method of claim 11, wherein informing the second processor that the first processor is in the one of the plurality of power states comprises monitoring the first processor's power state with a power state monitoring module operating in the second processor.

14. The method of claim 11, wherein determining whether the event indication matches an indication in the registered set of indication filtering criteria is performed within the second processor.

15. The method of claim 11, further comprising returning the first processor to a normal power state in response to determining that the event indication matches an indication in the registered set of indication filtering criteria.

16. The method of claim 11, wherein determining whether the event indication matches an indication in the registered set of indication filtering criteria is performed within a power controller coupled to the first processor.

17. The method of claim 16, wherein sending the event indication from the second processor to the first processor in response to determining that the event indication matches an indication in the registered set of indication filtering criteria specified for the one of the plurality of power states comprises:
receiving, in the power controller, the event indication generated by the communications control service on the second processor;
signaling from the power controller to the first processor a message to cause the first processor to transition to a second one of the plurality of power states; and
sending the event indication to the first processor from the power controller when the first processor has transitioned to the second one of the plurality of power states.

18. The method of claim 17, further comprising:
sending a query to the second processor from the first processor after the first processor has transitioned to the second one of the plurality of power states, wherein the query requests information regarding the event indication; and
sending information regarding the event indication from the second processor to the first processor in response to the query.

19. The method of claim 11, further comprising:
in response to determining that the event indication does not match an indication in the registered set of indication filtering criteria specified for the one of the plurality of power states:
storing the event indication; and
sending the stored event indication from the second processor to the first processor when the first processor has transitioned to the second one of the plurality of power states.

20. The method of claim 11, wherein the first processor is an applications processor, and the second processor is a modem.

21. A computing device, comprising:
a first processor; and
a second processor coupled to the first processor;
wherein the first processor and the second processor are configured with processor-executable instructions to perform operations comprising:
registering a set of indication filtering criteria on the second processor, wherein the set of indication filtering criteria identifies a communications control service on the second processor, and wherein the indication filtering criteria comprise indications that should be sent to the first processor when the first processor is in a low power state;
informing the second processor that the first processor is in the low power state;
establishing an event indication generated by the communications control service on the second processor;
determining whether the event indication matches an indication in the registered set of indication filtering criteria; and
sending the event indication from the second processor to the first processor in response to determining that the event indication matches an indication in the registered set of indication filtering criteria.

22. The computing device of claim 21, wherein the first processor is an applications processor, and the second processor is a modem.

23. A multi-processor computing device, comprising:
means for registering a set of indication filtering criteria on a first processor of the multi-processor computing device, wherein the set of indication filtering criteria identifies a communications control service on the first processor, and wherein the indication filtering criteria comprise indications that should be sent to a second processor of the multi-processor computing device when the second processor is in a low power state;
means for informing the first processor that the second processor is in the low power state;
means for establishing an event indication generated by the communications control service on the first processor;
means for determining whether the event indication matches an indication in the registered set of indication filtering criteria; and
means for sending the event indication from the first processor to the second processor in response to determining that the event indication matches an indication in the registered set of indication filtering criteria.

24. The multi-processor computing device of claim 23, wherein the first processor comprises a modem, and the second processor comprises an applications processor.

25. A non-transitory processor-readable storage medium having stored thereon processor-executable instruction configured to cause first and second processors of a multi-processor computing device to perform operations comprising:
registering a set of indication filtering criteria on the second processor, wherein the set of indication filtering criteria identifies a communications control service on the second processor, and wherein the indication filtering criteria comprise indications that should be sent to the first processor when the first processor is in a low power state;
informing the second processor that the first processor is in the low power state;
establishing an event indication generated by the communications control service on the second processor;
determining whether the event indication matches an indication in the registered set of indication filtering criteria; and
sending the event indication from the second processor to the first processor in response to determining that the event indication matches an indication in the registered set of indication filtering criteria.

26. The non-transitory processor-readable storage medium of claim 25, wherein the first processor is an applications processor, and the second processor is a modem.

27. The computing device of claim 21, wherein the first processor and the second processor are configured with processor-executable instructions to perform operations such that informing the second processor that the first processor is in the low power state comprises sending a power state message from the first processor to the second processor.

28. The computing device of claim 21, wherein the first processor and the second processor are configured with processor-executable instructions to perform operations such that informing the second processor that the first processor is in the low power state comprises monitoring the first processor's power state with a power state monitoring module operating in the second processor.

29. The computing device of claim 21, wherein the first processor and the second processor are configured with processor-executable instructions to perform operations such that determining whether the event indication matches an indication in the registered set of indication filtering criteria is performed within the second processor.

30. The computing device of claim 21, wherein the first processor and the second processor are configured with processor-executable instructions to perform operations further comprising:
returning the first processor to a normal power state in response to determining that the event indication matches an indication in the registered set of indication filtering criteria.

31. The computing device of claim 21, wherein the first processor and the second processor are configured with processor-executable instructions to perform operations such that determining whether the event indication matches an indication in the registered set of indication filtering criteria is performed within a power controller coupled to the first processor.

32. The computing device of claim 31, wherein the first processor and the second processor are configured with processor-executable instructions to perform operations such that sending the event indication from the second processor to the first processor in response to determining that the event indication matches an indication in the registered set of indication filtering criteria comprises:
receiving, in the power controller, the event indication generated by the communications control service on the second processor;
signaling from the power controller to the first processor a message to wake up the first processor; and
sending the event indication to the first processor from the power controller when the first processor has woken up and returned to normal power.

33. The computing device of claim 32, wherein the first processor and the second processor are configured with processor-executable instructions to perform operations further comprising:
sending a query to the second processor from the first processor after the first processor has returned to normal power, wherein the query requests information regarding the event indication; and
sending information regarding the event indication from the second processor to the first processor in response to the query.

34. The computing device of claim 21, wherein the first processor and the second processor are configured with processor-executable instructions to perform operations further comprising:
in response to determining that the event indication does not match an indication in the registered set of indication filtering criteria:
storing the event indication; and
sending the stored event indication from the second processor to the first processor when the first processor exits the low power state.

35. A computing device, comprising:
a first processor; and
a second processor coupled to the first processor;
wherein the first processor and the second processor are configured with processor-executable instructions to perform operations comprising:
registering, on a second processor, a set of indication filtering criteria specified for the one of the plurality of power states, wherein the set of indication filtering criteria identifies a communications control service on the second processor, and wherein the indication filtering criteria comprise indications that should be sent to the first processor when the first processor is in the one of the plurality of power states;
informing the second processor that the first processor is in the one of the plurality of power states;
establishing an event indication generated by the communications control service on the second processor;
determining whether the event indication matches an indication in the registered set of indication filtering criteria; and
sending the event indication from the second processor to the first processor in response to determining that the event indication matches an indication in the registered set of indication filtering criteria specified for the one of the plurality of power states.

36. The computing device of claim 35, wherein the first processor and the second processor are configured with processor-executable instructions to perform operations such that informing the second processor that the first processor is in the one of the plurality of power states comprises sending a power state message from the first processor to the second processor.

37. The computing device of claim 35, wherein the first processor and the second processor are configured with processor-executable instructions to perform operations such that Informing the second processor that the first processor is in the one of the plurality of power states comprises monitoring the first processor's power state with a power state monitoring module operating in the second processor.

38. The computing device of claim 35, wherein the first processor and the second processor are configured with processor-executable instructions to perform operations such that determining whether the event indication matches an indication in the registered set of indication filtering criteria is performed within the second processor.

39. The computing device of claim 35, wherein the first processor and the second processor are configured with processor-executable instructions to perform operations further comprising:
returning the first processor to a normal power state in response to determining that the event indication matches an indication in the registered set of indication filtering criteria.

40. The computing device of claim 35, wherein the first processor and the second processor are configured with processor-executable instructions to perform operations such that determining whether the event indication matches an indication in the registered set of indication filtering criteria is performed within a power controller coupled to the first processor.

41. The computing device of claim 40, wherein the first processor and the second processor are configured with processor-executable instructions to perform operations such that sending the event indication from the second processor to the first processor in response to determining that the event indication matches an indication in the registered set of indication filtering criteria specified for the one of the plurality of power states comprises:
receiving, in the power controller, the event indication generated by the communications control service on the second processor;
signaling from the power controller to the first processor a message to cause the first processor to transition to a second one of the plurality of power states; and
sending the event indication to the first processor from the power controller when the first processor has transitioned to the second one of the plurality of power states.

42. The computing device of claim 41, wherein the first processor and the second processor are configured with processor-executable instructions to perform operations further comprising:
sending a query to the second processor from the first processor after the first processor has transitioned to the second one of the plurality of power states, wherein the query requests information regarding the event indication; and
sending information regarding the event indication from the second processor to the first processor in response to the query.

43. The computing device of claim 35, wherein the first processor and the second processor are configured with processor-executable instructions to perform operations further comprising:
in response to determining that the event indication does not match an indication in the registered set of indication filtering criteria specified for the one of the plurality of power states:
storing the event indication; and
sending the stored event indication from the second processor to the first processor when the first processor has transitioned to the second one of the plurality of power states.

44. The computing device of claim 35, wherein the first processor is an applications processor, and the second processor is a modem.

45. The multi-processor computing device of claim 23, wherein means for informing the first processor that the second processor is in the low power state comprises means for sending a power state message from the second processor to the first processor.

46. The multi-processor computing device of claim 23, wherein means for informing the first processor that the second processor is in the low power state comprises means for monitoring the second processor's power state with a power state monitoring module operating in the first processor.

47. The multi-processor computing device of claim 23, wherein means for determining whether the event indication matches an indication in the registered set of indication filtering criteria is performed within the first processor.

48. The multi-processor computing device of claim 23, further comprising:
means for returning the second processor to a normal power state in response to determining that the event indication matches an indication in the registered set of indication filtering criteria.

49. The multi-processor computing device of claim 23, wherein means for determining whether the event indication matches an indication in the registered set of indication filtering criteria is performed within a power controller coupled to the second processor.

50. The multi-processor computing device of claim 49, wherein means for sending the event indication from the first processor to the second processor in response to determining that the event indication matches an indication in the registered set of indication filtering criteria comprises:
means for receiving, in the power controller, the event indication generated by the communications control service on the first processor;
means for signaling from the power controller to the second processor a message to wake up the second processor; and
means for sending the event indication to the second processor from the power controller when the second processor has woken up and returned to normal power.

51. The multi-processor computing device of claim 50, further comprising:
means for sending a query to the first processor from the second processor after the second processor has returned to normal power, wherein the query requests information regarding the event indication; and
means for sending information regarding the event indication from the first processor to the second processor in response to the query.

52. The multi-processor computing device of claim 23, further comprising:
in response to determining that the event indication does not match an indication in the registered set of indication filtering criteria:
means for storing the event indication; and
means for sending the stored event indication from the first processor to the second processor when the second processor exits the low power state.

53. A multi-processor computing device, comprising:
means for registering, on a first processor of the multi-processor computing device, a set of indication filtering criteria specified for the one of the plurality of power states, wherein:
the set of indication filtering criteria identifies a communications control service on the first processor; and
the indication filtering criteria comprise indications that should be sent to a second processor of the multi-processor computing device when the second processor is in the one of the plurality of power states;
means for informing the first processor that a second processor is in the one of the plurality of power states;
means for establishing an event indication generated by the communications control service on the first processor;
means for determining whether the event indication matches an indication in the registered set of indication filtering criteria; and
means for sending the event indication from the first processor to the second processor in response to determining that the event indication matches an indication in the registered set of indication filtering criteria specified for the one of the plurality of power states.

54. The multi-processor computing device of claim 53, wherein means for informing the first processor that the second processor is in the one of the plurality of power states comprises means for sending a power state message from the second processor to the first processor.

55. The multi-processor computing device of claim 53, wherein means for informing the first processor that the second processor is in the one of the plurality of power states comprises means for monitoring the second processor's power state with a power state monitoring module operating in the first processor.

56. The multi-processor computing device of claim 53, wherein the means for determining whether the event indication matches an indication in the registered set of indication filtering criteria are within the first processor.

57. The multi-processor computing device of claim 53, further comprising:
means for returning the second processor to a normal power state in response to determining that the event indication matches an indication in the registered set of indication filtering criteria.

58. The multi-processor computing device of claim 53, wherein the means for determining whether the event indication matches an indication in the registered set of indication filtering criteria are within a power controller coupled to the second processor.

59. The multi-processor computing device of claim 58, wherein means for sending the event indication from the first processor to the second processor in response to determining that the event indication matches an indication in the registered set of indication filtering criteria specified for the one of the plurality of power states comprises:
means for receiving, in the power controller, the event indication generated by the communications control service on the first processor;
means for signaling from the power controller to the second processor a message to cause the second processor to transition to a second one of the plurality of power states; and
means for sending the event indication to the second processor from the power controller when the second processor has transitioned to the second one of the plurality of power states.

60. The multi-processor computing device of claim 59, further comprising:
means for sending a query to the first processor from the second processor after the second processor has transitioned to the second one of the plurality of power states, wherein the query requests information regarding the event indication; and
means for sending information regarding the event indication from the first processor to the second processor in response to the query.

61. The multi-processor computing device of claim 53, further comprising:
in response to determining that the event indication does not match an indication in the registered set of indication filtering criteria specified for the one of the plurality of power states:
means for storing the event indication; and
means for sending the stored event indication from the first processor to the second processor when the second processor has transitioned to the second one of the plurality of power states.

62. The multi-processor computing device of claim 53, wherein the second processor is an applications processor, and the first processor is a modem.

63. The non-transitory processor-readable storage medium of claim 25, wherein the stored processor-executable instructions are configured to cause the first and second processors of a multi-processor computing device to perform operations such that:
informing the second processor that the first processor is in the low power state comprises sending a power state message from the first processor to the second processor.

64. The non-transitory processor-readable storage medium of claim 25, wherein the stored processor-executable instructions are configured to cause the first and second processors of a multi-processor computing device to perform operations such that:
informing the second processor that the first processor is in the low power state comprises monitoring the first processor's power state with a power state monitoring module operating in the second processor.

65. The non-transitory processor-readable storage medium of claim 25, wherein the stored processor-executable instructions are configured to cause the first and second processors of a multi-processor computing device to perform operations such that:
determining whether the event indication matches an indication in the registered set of indication filtering criteria is performed within the second processor.

66. The non-transitory processor-readable storage medium of claim 25, wherein the stored processor-executable instructions are configured to cause the first and second processors of a multi-processor computing device to perform operations further comprising:
returning the first processor to a normal power state in response to determining that the event indication matches an indication in the registered set of indication filtering criteria.

67. The non-transitory processor-readable storage medium of claim 25, wherein the stored processor-executable instructions are configured to cause the first and second processors of a multi-processor computing device to perform operations such that:
determining whether the event indication matches an indication in the registered set of indication filtering criteria is performed within a power controller coupled to the first processor.

68. The non-transitory processor-readable storage medium of claim 67, wherein the stored processor-executable instructions are configured to cause the first and second processors of a multi-processor computing device to perform operations such that sending the event indication from the second processor to the first processor in response to determining that the event indication matches an indication in the registered set of indication filtering criteria comprises:
receiving, in the power controller, the event indication generated by the communications control service on the second processor;
signaling from the power controller to the first processor a message to wake up the first processor; and
sending the event indication to the first processor from the power controller when the first processor has woken up and returned to normal power.

69. The non-transitory processor-readable storage medium of claim 58, wherein the stored processor-executable instructions are configured to cause the first and second processors of a multi-processor computing device to perform operations further comprising:
sending a query to the second processor from the first processor after the first processor has returned to normal power, wherein the query requests information regarding the event indication; and sending information regarding the event indication from the second processor to the first processor in response to the query.

70. The non-transitory processor-readable storage medium of claim 25, wherein the stored processor-executable instructions are configured to cause the first and second processors of a multi-processor computing device to perform operations further comprising:
in response to determining that the event indication does not match an indication in the registered set of indication filtering criteria:
storing the event indication; and
sending the stored event indication from the second processor to the first processor when the first processor exits the low power state.

71. A non-transitory processor-readable storage medium having stored thereon processor-executable instructions configured to cause a first and a second processor of a multi-processor computing device to perform operations comprising:
registering, on the second processor of the multi-processor computing device, a set of indication filtering criteria specified for the one of the plurality of power states, wherein:
the set of indication filtering criteria identifies a communications control service on the second processor; and
the indication filtering criteria comprise indications that should be sent to the first processor when the first processor is in the one of the plurality of power states;
informing the second processor that the first processor is in the one of the plurality of power states;
establishing an event indication generated by the communications control service on the second processor;
determining whether the event indication matches an indication in the registered set of indication filtering criteria; and
sending the event indication from the second processor to the first processor in response to determining that the event indication matches an indication in the registered set of indication filtering criteria specified for the one of the plurality of power states.

72. The non-transitory processor-readable storage medium of claim 71, wherein the stored processor-executable instructions are configured to cause the first and second processors of a multi-processor computing device to perform operations such that:
informing the second processor that the first processor is in the one of the plurality of power states comprises sending a power state message from the first processor to the second processor.

73. The non-transitory processor-readable storage medium of claim 71, wherein the stored processor-executable instructions are configured to cause the first and second processors of a multi-processor computing device to perform operations such that:
informing the second processor that the first processor is in the one of the plurality of power states comprises monitoring the first processor's power state with a power state monitoring module operating in the second processor.

74. The non-transitory processor-readable storage medium of claim 71, wherein the stored processor-executable instructions are configured to cause the first and second processors of a multi-processor computing device to perform operations such that:
determining whether the event indication matches an indication in the registered set of indication filtering criteria is performed within the second processor.

75. The non-transitory processor-readable storage medium of claim 71, wherein the stored processor-executable instructions are configured to cause the first and second processors of a multi-processor computing device to perform operations further comprising:
returning the first processor to a normal power state in response to determining that the event indication matches an indication in the registered set of indication filtering criteria.

76. The non-transitory processor-readable storage medium of claim 71, wherein the stored processor-executable instructions are configured to cause the first and second processors of a multi-processor computing device to perform operations such that:
determining whether the event indication matches an indication in the registered set of indication filtering criteria is performed within a power controller coupled to the first processor.

77. The non-transitory processor-readable storage medium of claim 76, wherein the stored processor-executable instructions are configured to cause the first and second processors of a multi-processor computing device to perform operations such that sending the event indication from the second processor to the first processor in response to determining that the event indication matches an indication in the registered set of indication filtering criteria specified for the one of the plurality of power states comprises:
receiving, in the power controller, the event indication generated by the communications control service on the second processor;
signaling from the power controller to the first processor a message to cause the first processor to transition to a second one of the plurality of power states; and
sending the event indication to the first processor from the power controller when the first processor has transitioned to the second one of the plurality of power states.

78. The non-transitory processor-readable storage medium of claim 77, wherein the stored processor-executable instructions are configured to cause the first and second processors of a multi-processor computing device to perform operations further comprising:
sending a query to the second processor from the first processor after the first processor has transitioned to the second one of the plurality of power states, wherein the query requests information regarding the event indication; and
sending information regarding the event indication from the second processor to the first processor in response to the query.

79. The non-transitory processor-readable storage medium of claim 71, wherein the stored processor-executable instructions are configured to cause the first and second processors of a multi-processor computing device to perform operations further comprising:
in response to determining that the event indication does not match an indication in the registered set of indication filtering criteria specified for the one of the plurality of power states:
storing the event indication; and
sending the stored event indication from the second processor to the first processor when the first processor has transitioned to the second one of the plurality of power states.

80. The non-transitory processor-readable storage medium of claim 71, wherein the stored processor-executable instructions are configured such that the first processor is an applications processor, and the second processor is a modem.

* * * * *